Patented June 2, 1931

1,807,704

UNITED STATES PATENT OFFICE

ARCHIE PAPPADIS, OF NORFOLK, VIRGINIA

CHEWING GUM AND METHOD OF MAKING THE SAME

No Drawing.   Application filed December 14, 1927. Serial No. 240,084.

The present invention relates to the production of a chewing gum from substances found in nature and has for one of its objects to provide a chewing gum, the attractive and beneficial qualities of which will not diminish under the influence of prolonged mastication.

Other objects are to provide a gum which will have a sweetening and deodorizing effect on the breath, which will aid digestion, is mildly laxative, will relieve gas and a so-called "sour-stomach", and is adapted for reuse.

A further object is to so treat gums and resins which do not develop the desired plasticity for use as chewing gums under the influence of the heat and moisture of the mouth that their plasticity under these conditions will be improved.

More specifically, objects of the invention are to so treat the gum or resin of the mastic tree that it will be rendered more plastic under the influence of heat and moisture of the mouth and so that its adhesive qualities will be diminished.

A further and important object of the invention is to provide a chewing gum that will not adhere to objects with which it comes in contact with such tenacity that it may not be readily and thoroughly removed by mechanical means alone.

Still further objects are to provide a gum the flavor of which will persist longer than that of gums now in use and which will not develop a disagreeable taste upon prolonged chewing and which will not become crummy.

Other objects and advantages will appear from the following specification and will be set forth in the appended claims.

The gum of the mastic tree which is known in the trade as "masticha" or "skinos" has for many years been used in the manufacture of confections, particularly in the manufacture of chocolates. The gum is obtained by making an incision in the trunk of the tree and comes on the market in the form of hard brittle globules or tears of a somewhat translucent amber hue. Under the influence of the heat and moisture of the mouth when being chewed, the gum becomes gradually plastic changing under continued mastication to an opaque, white plastic mass. This mass is pleasant to the taste and has a persistent flavor which lasts as long as the mass is chewed. The chewing of this gum has no deleterious effect on the human system but on the contrary sweetens and deodorizes the breath, cleanses the teeth, has a mildly laxative effect on alimentation, relieves gas and the so-called "sour stomach."

The gum has also a desirable characteristic in that, while it will adhere to objects with which it contacts, it may be readily and completely removed from such objects by mechanical means alone and may be stored in a simple wrapping of paper without danger of its adhering thereto with any considerable degree of tenacity. The gum may for this reason be put away after being used for a subsequent use when it is being kept on hand for gastronomical purposes.

While this gum may be used in its natural state for chewing purposes it may be rendered more palatable and suitable for chewing by adding thereto substances that will render it more readily plastic under the influence of the heat and moisture of the mouth when being chewed and which will diminish the adhesive qualities thereof. In order to accomplish these objects, I add to the gum a small amount of beeswax according to conditions from 3 to 8% to increase the plasticity, and a small amount of sweet, pure olive oil, about 2 to 6% to counteract the stickiness of the gum. The gum may also be rendered more palatable by adding thereto in the course of manufacture a sweetening and a flavoring substance. I prefer as a flavoring, rose oil on account of its persistent and pleasant qualities. For sweetening, I use sugar dissolved in water to which I add a small quantity of lemon juice to prevent crystallization of the sugar.

A complete formula containing these ingredients may be represented as follows:

| | Per cent |
|---|---|
| Mastic gum | 50 |
| Beeswax | 6 |
| Olive oil | 4 |
| Sugar syrup | 35 |
| Lemon juice | 5 |

The flavoring required for this quantity on an ounce basis, the batch consisting of one hundred ounces is three sixteenths of an ounce. It will be understood that the above proportions may be varied as found desirable and that other substances than those specified may be compounded with the mastic gum for accomplishing the same or similar purposes to those of the ingredients specified.

The above composition may be prepared in the following manner: Place the quantity of beeswax necessary for the batch to be made up in a double boiler and heat until melted, stir in the sweet pure olive oil, then stir in the granulated mastic gum, continuing the stirring until the mass becomes thoroughly homogeneous. The syrup to which the lemon juice has been added may then be stirred in and the contents of the vessel, after the materials have become thoroughly mixed, may be poured out onto a cold, smooth surface as a slab of marble and allowed to cool. As an alternative, the syrup may be placed on the slab. The mass when so poured out, if of a proper consistency, will spread in a thin sheet of fairly uniform thickness. The sheet so formed may then be covered on both sides with pulverized sugar after a small amount of rose oil has been applied to the surfaces with a soft stick or brush. The rose oil may be mixed into the mass while in its molten state if desired. The sheet may then be passed between rollers to give it uniformity of thickness if found necessary and cut into strips of equal width and length. The heating of the materials in order to provide a homogeneous product requires from 15 to 20 minutes according to the size of the mass and other attending circumstances.

While I prefer the above composition, it is to be understood that other substances than beeswax may be used to render the gum sufficiently plastic for use as a chewing gum and other substances than olive oil may be incorporated to counter the stickiness of the gum. I may also vary the flavor and the percentages of ingredients. I do not therefore wish to be limited in the scope of my invention except as I shall be limited by the hereto appended claims.

Having described my invention, what I claim is:

1. A compound for chewing gum consisting of the following ingredients substantially in the proportions specified by percentage, beeswax 6%; sweet pure olive oil 4%; granulated mastic gum 50%; sugar syrup 35%; lemon juice 5%, and a trace of rose oil as a flavoring.

2. A process for producing a chewing gum consisting in first heating beeswax until liquefied; mingling sweet pure olive oil until a thorough admixture is obtained, after which granulated mastic gum is added and the mass thoroughly agitated, to which sugar syrup containing lemon juice is added and the mass thoroughly agitated until a homogeneous admixture is obtained and the mass poured on a suitable slab, and adding a trace of rose oil during said pouring.

In testimony whereof I hereby affix my signature.

ARCHIE PAPPADIS.